(No Model.)
G. C. H. HASSKARL.
RAILROAD TIE.
No. 319,813. Patented June 9, 1885.
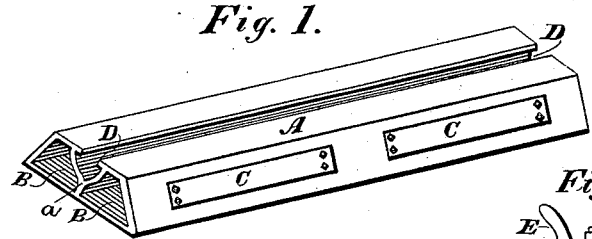
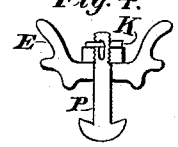
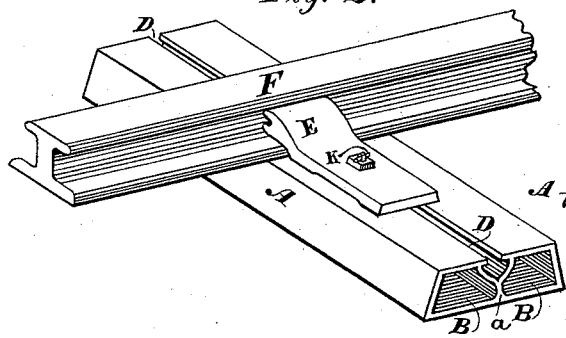
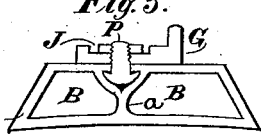
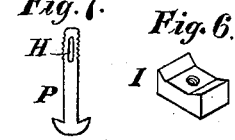
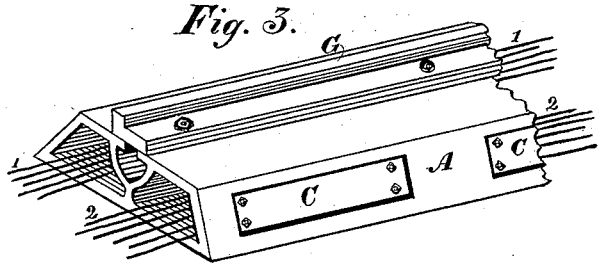
Witnesses:
William S. Hasskarl
J. Gordon Shumaker
Inventor:
Gottlieb Christopher H. Hasskarl
Per G. J. Oplinger
Attorney.

UNITED STATES PATENT OFFICE.

GOTTLIEB CHRISTOPHER HENRY HASSKARL, OF PHILADELPHIA, PA.

RAILROAD-TIE.

SPECIFICATION forming part of Letters Patent No. 319,813, dated June 9, 1885.

Application filed October 13, 1884. (No model.)

*To all whom it may concern:*

Be it known that I, GOTTLIEB CHRISTOPHER HENRY HASSKARL, a citizen of the United States, residing at Philadelphia, and State of Pennsylvania, have invented a new and useful Railroad-Tie, of which the following is a specification.

This invention relates to improvements in metallic railroad sleepers or ties, and has for its objects to so construct the same that the rails may be secured to them at any desired point on their surface, and to provide means whereby the sleepers may be used as conduits for telegraph or similar wires.

In the accompanying drawings, Figure 1 represents a perspective view of my improved railroad sleeper or tie. Fig. 2 is a similar view, showing the invention in use as a railroad-tie and the manner of fastening the rails to the same. Fig. 3 is a perspective view of the invention used as a street-car-rail sleeper, and also as a conduit for telegraph or like wires. Fig. 4 is a detail view, showing a double clip used in fastening the rails at switches or on double-rail tracks. Fig. 5 is an end view illustrating one manner of fastening street-car rails to the sleepers. Figs. 6 and 7 are details of a nut and bolt, which may be used in fastening the rails and ties together.

A represents the body of the sleeper or tie, which may be made of cast-iron, steel, or other suitable material, and which is constructed with a wide base and inclined sides, and a central longitudinal Y-shaped partition, $a$, which divides the sleeper into two compartments, B, hereinafter referred to.

D is a central longitudinal groove in the top of the sleeper, the bottom and sides of which are formed by the bifurcation of the partition $a$. The top of the groove is provided with suitable flanges adapted to hold the head of a bolt or nut which has been inserted in the groove.

In Fig. 2 the invention is used as a tie for railroad-rails, and shows a rail, F, fastened in place by a clip, E, which is secured to the tie by a suitable nut and bolt.

To fasten the clips or street-car rails to the tie, a bolt, P, is inserted in the groove D, with its head sufficiently large to engage the flanges of the groove. The threaded end of the bolt is then passed through the openings in the clip or rail, and the nut J of the bolt tightly screwed down, firmly binding the rail or clip to the tie, as shown in Fig. 5.

If desired, the bolt may be provided with a slot, H, (shown in Fig. 7,) and after the nut is screwed fast a wedge, K, (shown in Fig. 4,) may be driven in and the ends bent around the bolt, thereby securely binding the nut in place.

A nut, I, (shown in Fig. 6,) may be inserted in the groove and the bolt be screwed into it, with its head on the top of the rail or clip.

In Fig. 4 is shown a double clip, E, which is used to secure the rails of a double-rail track or of switches in position.

When the invention is used as a sleeper for street-car rails, the sleepers are arranged longitudinally in line with each other, their ends being close together and held in place by the rails G. The compartments B will form a continuous channel or conduit through the sleepers, in which may be run cables or wires 1 and 2 for electrical purposes, as shown in Fig. 3. In this case the sleepers are provided with openings through which the wires can be adjusted, and these openings are closed by means of removable doors or plates C, bolted in position.

When the invention is used on railroads, the compartment B admit of wires being passed under the rails without the necessity of making trenches beneath the bed of the road.

I have only illustrated a straight sleeper or tie; but on curves of the roads in street-railways I purpose making the sleepers correspond with the curves of the track, but preserving the features of the invention.

It will be observed that by my construction I obtain great strength in the tie or sleeper to support weight, while using a comparatively small amount of metal, and also prevent rocking of the sleepers by having the base wider than the top—a special advantage for street-railways, as thereby the outward thrust of the car-wheels is overcome. It will also be observed that any number of rails may be secured to the sleeper, in any desired positions, by the above-described means.

I am aware that metal ties have been made having a central wedge-shaped groove adapted to hold the head of a bolt and allowing the adjustment of the rail thereon. Therefore I do not broadly claim such feature of the invention.

What I claim is—

1. A metallic railroad tie or sleeper provided with a central longitudinal Y-shaped partition and compartments, B B, substantially as described.

2. A metallic railroad sleeper or tie constructed with sides slanting outwardly from top to base, and provided with a central longitudinal Y-shaped partition forming the compartments B B and groove D, substantially as specified.

3. The metal railroad tie or sleeper A, formed with passages B B, central groove, D, and openings in its sides provided with removable covers C, all substantially as and for the purposes set forth.

4. The combination, with a metallic railroad sleeper or tie provided with a central longitudinal Y-shaped partition, a, forming the conduits B, and its bifurcation, forming the bottom and sides of the flanged groove D, of means for adjustably securing the rails to the sleepers, substantially as described.

GOTTLIEB CHRISTOPHER H. HASSKARL.

Witnesses:
WILLIAM S. HASSKARL,
J. GORDON SHOWAKER.